No. 626,134. Patented May 30, 1899.
C. O. BASTIAN.
PREPAYMENT ELECTRICAL METER.
(Application filed Dec. 13, 1897.)
(No Model.) 6 Sheets—Sheet 1.
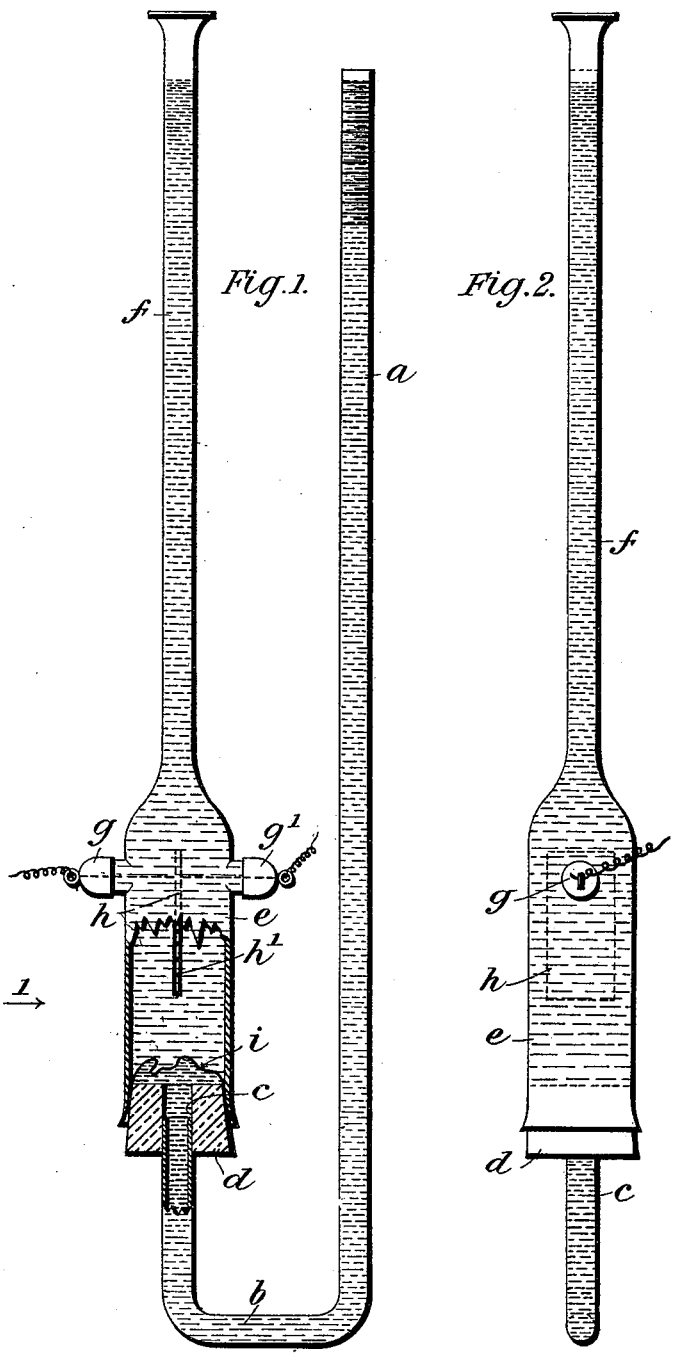
Witnesses
John Chalmers Wilson
D. H. Blakelock
Inventor
C. O. Bastian
by Wilkinson & Fisher,
Attorneys No. 626,134. Patented May 30, 1899.
C. O. BASTIAN.
PREPAYMENT ELECTRICAL METER.
(Application filed Dec. 13, 1897.)

(No Model.) 6 Sheets—Sheet 2.

Witnesses
John Chalmers Weber
D. H. Blakelock

Inventor
C. O. Bastian
by Wilkinson & Fisher
Attorneys

No. 626,134. Patented May 30, 1899.
C. O. BASTIAN.
PREPAYMENT ELECTRICAL METER.
(Application filed Dec. 13, 1897.)
(No Model.) 6 Sheets—Sheet 3.

Witnesses
John Chalmers Wilson
D. H. Blakelock

Inventor
C. O. Bastian
by Wilkinson & Fisher
Attorneys

No. 626,134. Patented May 30, 1899.
C. O. BASTIAN.
PREPAYMENT ELECTRICAL METER.
(Application filed Dec. 13, 1897.)

(No Model.) 6 Sheets—Sheet 4.

Witnesses
John Chalmers Wilson.
L. H. Blakelock

Inventor
C. O. Bastian
by Wilkinson & Fisher.
Attorneys

No. 626,134. Patented May 30, 1899.
C. O. BASTIAN.
PREPAYMENT ELECTRICAL METER.
(Application filed Dec. 13, 1897.)

(No Model.) 6 Sheets—Sheet 5.

Witnesses

Inventor
C. O. Bastian
by Wilkinson & Fisher
Attorneys

No. 626,134. Patented May 30, 1899.
C. O. BASTIAN.
PREPAYMENT ELECTRICAL METER.
(Application filed Dec. 13, 1897.)
(No Model.) 6 Sheets—Sheet 6.

Witnesses
Inventor

United States Patent Office.

CHARLES ORME BASTIAN, OF LONDON, ENGLAND.

PREPAYMENT ELECTRICAL METER.

SPECIFICATION forming part of Letters Patent No. 626,134, dated May 30, 1899.

Application filed December 13, 1897. Serial No. 661,677. (No model.)

*To all whom it may concern:*

Be it known that I, CHARLES ORME BASTIAN, electrical engineer, a subject of the Queen of Great Britain, residing at 8ª Manchester Square, London, England, have invented certain new and useful Improvements in or Relating to Prepayment Electrical Meters, of which the following is a specification.

This invention relates to improvements in prepayment electrical meters; and it consists in the novel devices and combination of parts hereinafter described and claimed and which will be understood by reference to the accompanying drawings, wherein the same parts are indicated by similar letters throughout the several views.

Figure 3:
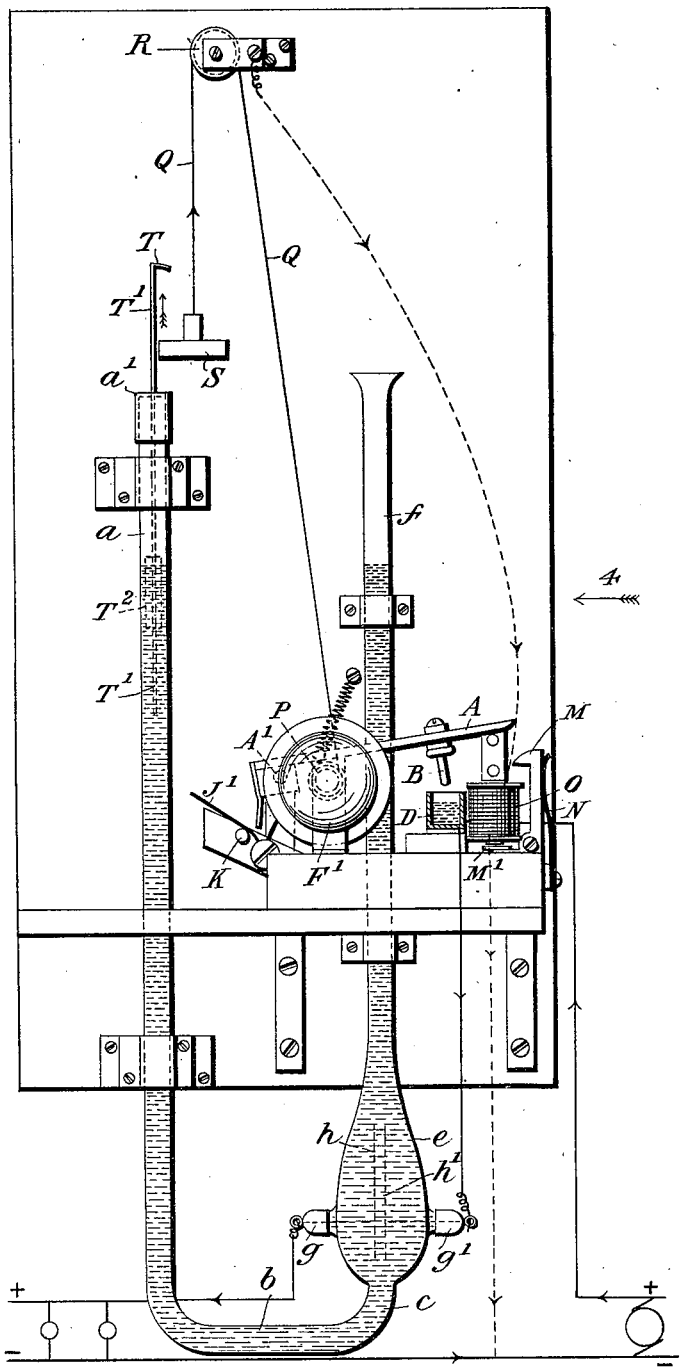
Figure 4:
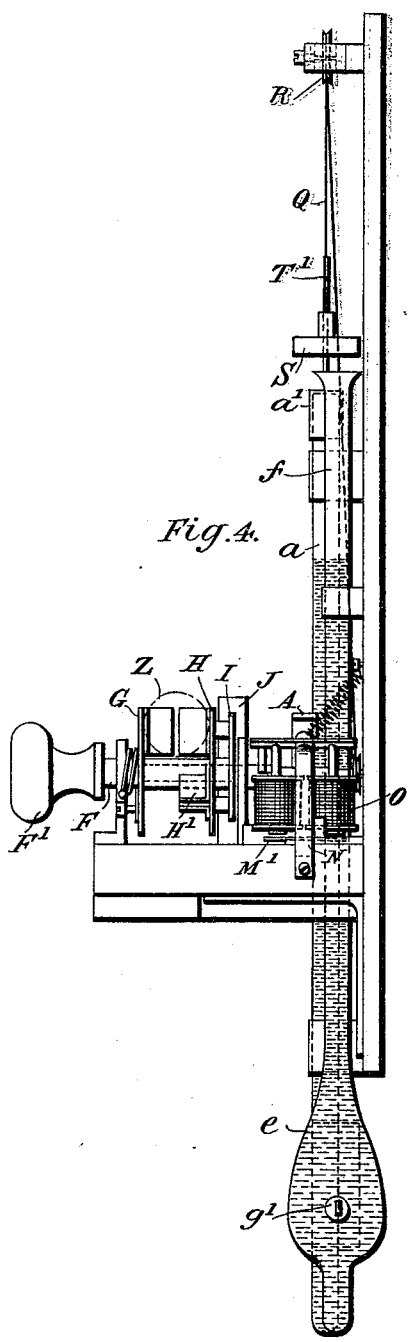
Figure 5:
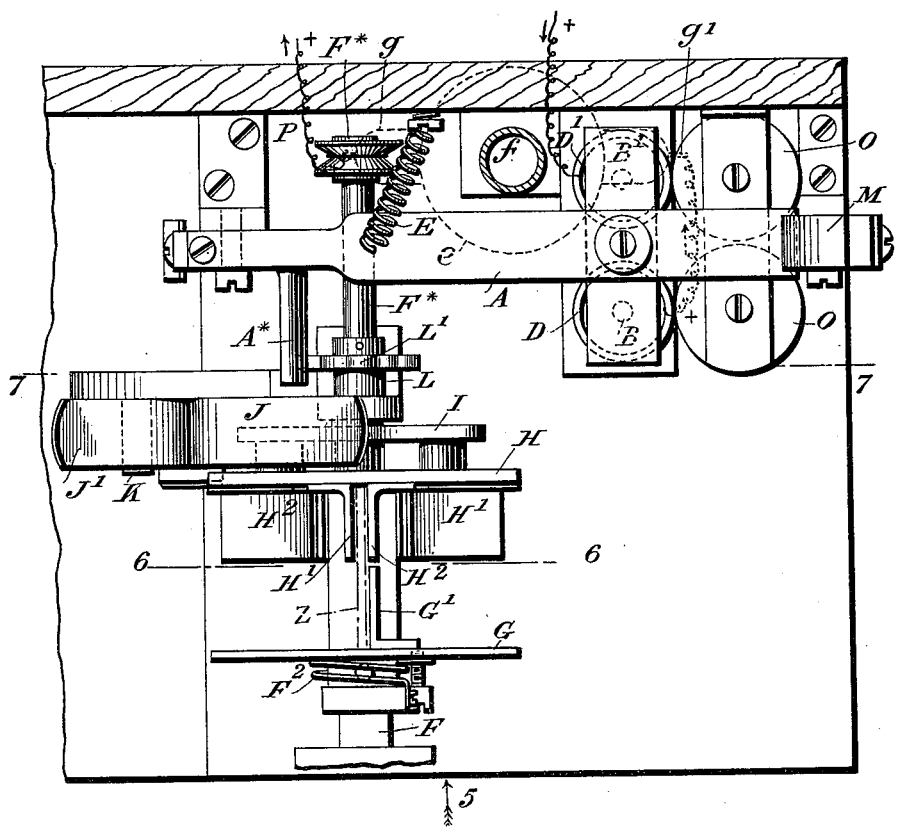
Figure 6:
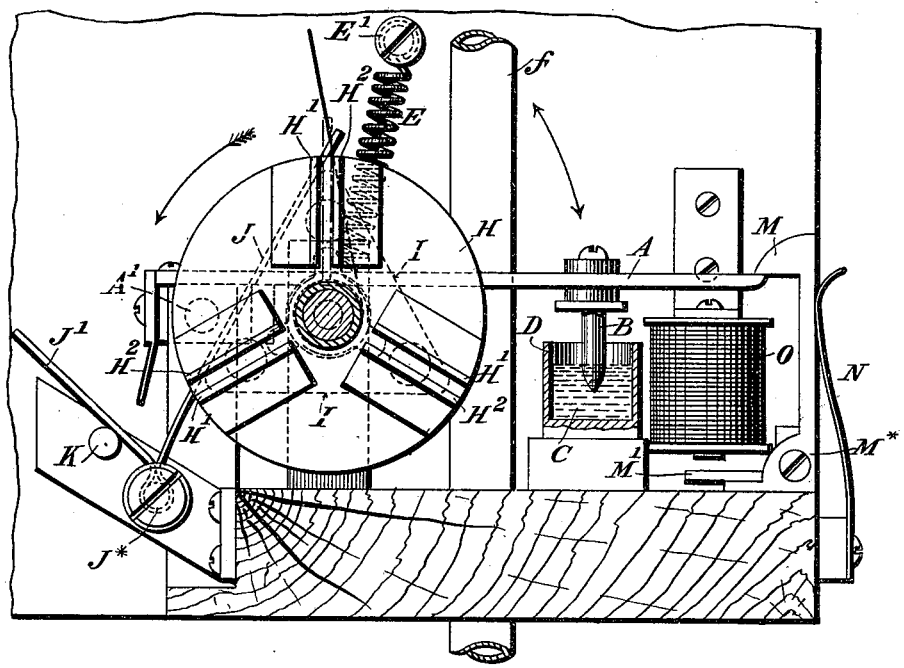
Figure 7:
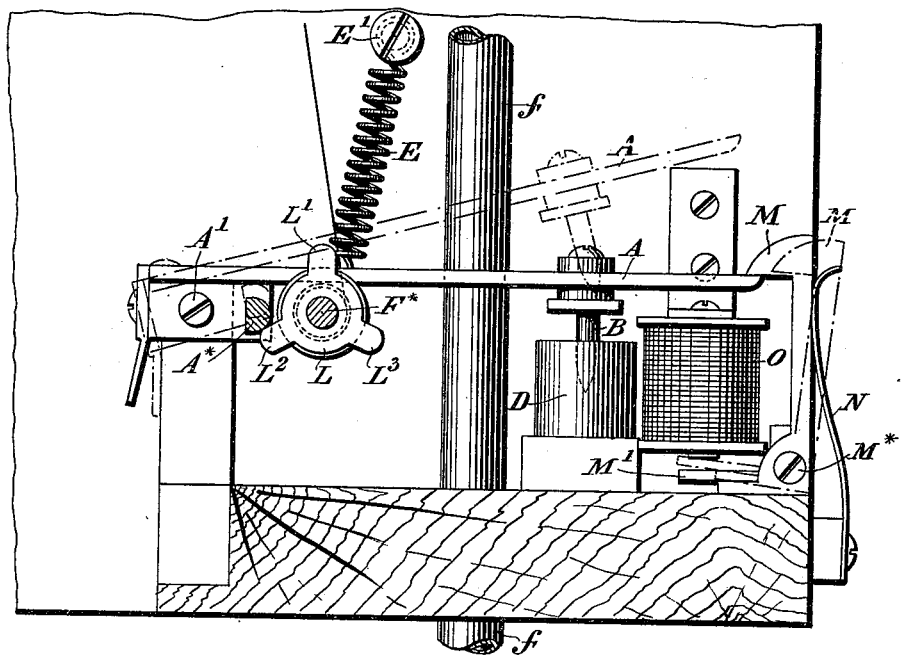

Figure 1 is an elevation, partly in section, of a form of meter to which my invention is applicable; and Fig. 2 is a view taken at right angles to Fig. 1 and looking in the direction of the arrow in said figure. Fig. 3 is a view in elevation of my invention applied to a meter similar to that shown in Figs. 1 and 2. Fig. 4 is a view taken at right angles to Fig. 3 in elevation and looking in the direction of the arrow 4 in said figure. Fig. 5 is a plan view of Figs. 3 and 4 on an enlarged scale. Fig. 6 is a cross-sectional view on the line 6 6 in Fig. 5 and looking in the direction of the arrow 5, the mercury-cup being also shown in section; and Fig. 7 is a cross-sectional view on line 7 7 in Fig. 5, also looking in the direction of the arrow 5.

Referring particularly to Figs. 1 and 2, *a* is a tube (advantageously of glass or other suitable transparent material) which is bent round at *b* and terminates at *c* in a plug or block *d*, of rubber or other suitable material, which block *d* fits tightly within the lower end of the enlarged part *e* of the tube *f*. The electric current enters the enlarged part *e* through the conductors or connections *g g'* and thence to the electrodes *h h'*, which latter are mounted and held apart in any known or suitable manner. Thus a continuous tube is formed from *a* to *f* with an enlarged part *e* therein, the plug or block *d* connecting the two parts of the tube together in a liquid-tight manner; or, if desired, the whole of the U-shaped tube or vessel *a* to *f* may be made all in one part, although I consider the arrangement illustrated as more advantageous, since it permits ready access to the interior of the enlarged part *e* and the electrodes therein.

I find it advantageous to use a colored liquid (water) in the tube *a b c* and a slightly-acidulated liquid (water) in the part *e f*, and in order to prevent these two liquids mingling I may use a loose bag, advantageously a very thin flexible rubber bag *i* sufficiently loose to receive therein as much of the colored liquid as will flow from the tube *a b c* into the tube *e f* during the action of the meter, such flexible bag *i* being fitted in a liquid-tight manner over the plug, as illustrated, (or over the tube end *c*,) so that no mingling of the two liquids can take place. A scale or other suitable index may be provided on the arm *a* of the U-shaped device or on the arm *f*, or both.

The operation is as follows: When the electrical current flows through the electrolyte in the chamber *e*, thereby electrolytic action is caused and the gases caused by such electrolysis escape out of the tube *f*, and consequently the column of liquid in the arm *f* descends, and it follows that the column of liquid in the arm *a* will correspondingly descend, and thus the alteration in the height of said columns will be the measure or indication of the amount of electric current that has passed— that is to say, the amount of water that is decomposed by an electric current of a given strength in a given time is well known and understood, and therefore by measuring off (by means of the falling column of liquid) the amount of electrolyte that has been decomposed by the electric current passing therethrough as aforesaid I am enabled to measure and indicate the amount of current used and consequently the amount of current to be paid for by the consumer.

The column *f* is refilled or replenished with the electrolyte from time to time, as required.

Referring now to Figs. 3 to 7, in this arrangement the vessel *a*, *b*, *c*, *e*, and *f* for holding the electrolyte is shown formed all in one part advantageously of glass, the current passing to the electrodes *h* and *h'* through the connectors or connections *g g'*, so that when the electric circuit is completed and the current flowing through *g g'* thereby the electrolyte is decomposed, and consequently the height of the column of liquid in the arms *a* and *f*, respectively, is reduced. To utilize this gradual decrease in the height of the column of liquid in the arm $a$ for the purpose of prepayment electric meters, I proceed as follows: A is a contact making and breaking device pivoted at A', carrying on the under side thereof two pins or projections B B' in electrical connection with one another and adapted to respectively enter the mercury C in the mercury holders or vessels D D', which latter are insulated from one another, the main-circuit wires being connected, respectively, to the said mercury cups or vessels D D', or, if desired, only one mercury-cup, such as D, may be used, one wire of the main circuit being connected to said cup and the other wire connected to the device A, a spring E (one end of which is fixed to the frame at E' and the other end attached to the device A) serving to normally hold said device A in the position shown in dotted lines in Fig. 7, so that the contact-piece B is normally held out of contact with the mercury C in the cup D, and thereby the main circuit is broken.

In order to close the main circuit on the insertion of a coin, any suitable prepayment mechanism may be used—such, for instance, as that illustrated in the drawings, which consists of a spindle F, having a knob F' on the end thereof, by rotating which latter the spindle F, and with it the disk G, with flange G' thereon, is rotated. Another disk H is fixed rigidly on a separate spindle $F^\times$, this spindle $F^\times$ being entirely-independent of the first-named spindle F. The disk H carries three pairs of flanges H' $H^2$ thereon, each such flange H' being arranged at such distance from its adjacent flange $H^2$ as to permit a coin or token of suitable value to enter edgewise between said pairs of flanges, (see Figs. 4 and 5,) and these three pairs of flanges H' and $H^2$ are arranged in pairs on the face of the disk H equidistant from one another. (See Fig. 6.) On the insertion of a coin or token, such as Z, (see Figs. 4 and 5,) thereby on twisting the handle F' to the left the disks G and H will be locked together by said coin through the flanges G' and H' $H^2$, respectively, and consequently the disk H will be revolved through one-third of a circle, the exact amount of such revolution being insured by means of the triangular-shaped piece I, fixed rigidly to the back of the disk H, a strong spring J, pivoted to the frame at $J^\times$, being held firmly against the said triangular piece I by means of the end J' of said spring supported on the fixed stud K. In this manner the spindle $F^\times$ is turned through one-third of a revolution, and this spindle $F^\times$ has rigidly fixed thereon a triangular device L, one of the three cams, cranks, or extremities L', $L^2$, or $L^3$ being by such one-third revolution brought in contact with a spring arm or extension $A^\times$, fixed to or formed on the aforesaid pivoted make-and-break device A, whereby the latter is thus forced down (against the action of the spring E) into the horizontal position shown in full lines in Fig. 7, and is there caught and held down by the spring-catch M, said catch, which is normally pressed into position to hold said device A by the spring N, (see Figs. 6 and 7,) being pivoted at $M^\times$, and the ends M' thereof extending as an armature just under the coils O of a shunt-circuit. On the aforesaid shaft or spindle $F^\times$ there is rigidly fixed a reel or drum P, to which is attached one end of a metallic tape or soft flexible conducting-wire Q, several turns of this latter being wound upon said reel or drum P and thence passing up over an idle roller or pulley R and descending and terminating with the weight S, which latter is attached to this end of the connection Q, said weight S, furthermore, forming one of the contacts in a shunt-circuit by which the coils O are energized when said local circuit is completed, as hereinafter described. T is the other contact in said local circuit, being formed by the turned-over end of a wire (advantageously copper) T', which passes freely through the guide-cap $a'$ on the top of the tube $a$ into said tube and has a cork float $T^2$ firmly fixed thereto, the lower end of said copper wire T' terminating in the liquid in which it is always immersed in said tube $a$.

The operation is as follows: On the insertion of a coin or token of proper value or denomination the spindle $F^\times$ can be revolved, (by means of the handle F', which latter is returned by suitable spring $F^2$, and thereby permits the coin to drop into a suitable receptacle,) and thereby a portion of the flexible connection Q is unwound off the drum P, and the contact-piece S descends a measured distance from the other contact T in the local circuit. At the same time the device A is forced down until caught and held by the spring-catch M, and the main circuit is thus completed, and as the current flows the electrolytic action causes the descent of the column of liquid in the tube $a$ and the float $T^2$ therein thus gradually descends with said liquid until the contact-piece T comes in contact with the other contact-piece S in the local circuit, whereupon said local circuit is completed and energizes the magnets O, which thereupon attract the armature M' and draw the same up into the position shown in dotted lines in Fig. 7, this action consequently moving the catch M off the device A, and the latter on thus being released is instantly pulled up (into the position shown in dotted lines in Fig. 7) by the spring E, whereupon the main circuit is broken, and consequently the local circuit is also broken and the armature M' is released by the magnets O, and the catch M is now forced by the spring N into the position to again engage with the device A on the latter being again forced down, as aforesaid.

The meter, either arranged as in Figs. 1 and 2 or as in Figs. 3 to 7, is cased in or inclosed in any suitable case or inclosure, so as to prevent access to same except by duly-authorized persons.

It will be obvious that I may, if desired, use only one column instead of two columns, as illustrated in the drawings. For instance, I may use only the column or tube $f$, with the enlarged portion $e$ at the lower end thereof, and measure off the amount of descent of the electrolyte in said column $f$ when using the meter as a simple current-meter, as hereinbefore described with reference to Figs. 1 and 2, or in the case of a prepayment-meter the floating contact device T T' T² would be arranged to act in such single tube $f$ in the same manner as hereinbefore described with reference to the tube $a$, Figs. 3 to 7.

In order to prevent or reduce evaporation of the electrolyte (water) by exposure to the atmosphere of the upper surface thereof in the tube or tubes $f$ or (and) $a$, I find it very advantageous to put a little oil, which will float, on the top of each column of water, and thereby cover and protect the latter from evaporation by the atmosphere.

What I claim is—

1. In a prepayment mechanism for electric meters, the combination with a rotatable spindle, and means for causing said spindle to rotate through the medium of an inserted coin; of a drum on said spindle; a flexible electric conductor secured to and wound upon said drum and reeving over a pulley; a weight suspended from said flexible conductor and constituting a contact device in a local circuit; a second contact device in said local circuit adapted to fall with the working of the meter, and to make contact with said weight; a circuit-closer in the main circuit adapted to be operated by the rotation of said spindle to close the main circuit through the meter; an armature adapted to hold said circuit-closer in the closed position; a magnet, in said local circuit adapted, upon said local circuit being closed, to become energized, and to release said armature from said circuit-closer; and a spring acting on said circuit-closer and tending to hold the same out of contact, substantially as described.

2. In a prepayment mechanism for electric meters, the combination with a rotatable spindle, and means for causing said spindle to rotate through the medium of an inserted coin; of a drum on said spindle; a flexible electric conductor secured to and wound upon said drum and reeving over a pulley; a weight suspended from said flexible conductor and constituting a contact device in a local circuit; a second contact device in said local circuit in such operative connection with the meter that it will be caused to fall during the operation of the meter, and by falling come into contact with said weight; a disk provided with a plurality of equidistant peripheral lugs rigidly mounted upon said spindle; a circuit-closer for the main circuit, having a spring-arm thereon adapted to be struck by one of said lugs, and adapted to be moved into the position to close the main circuit through the meter, during the partial rotation of said spindle; a spring-catch adapted to engage said circuit-closer in its closed position; a spring tending to hold said circuit-closer out of contact; and a magnet in said local circuit adapted to become energized and to release said catch from said circuit-closer and break the main circuit, substantially as described.

3. In a prepayment mechanism for electric meters, the combination with a rotatable spindle, and means for causing said spindle to rotate through the medium of an inserted coin; of a drum on said spindle; a flexible electric conductor secured to and wound upon said drum and reeving over a pulley; a weight constituting a contact device in a local circuit suspended from said flexible conductor; a second contact device in said local circuit adapted to fall with the reduction of volume of the electrolyte in the meter, and to make contact with said weight; an angular disk having a plurality of straight edges of equal length upon its periphery, rigidly mounted upon said spindle; a flat spring-arm bearing against the periphery of said disk and adapted when bearing upon one of said straight edges, to retard the rotation of said spindle; a circuit-closer for the main circuit, adapted to be moved into the position to complete the main circuit through the meter, when the said spindle is rotated; a spring-catch adapted to engage said circuit-closer in its closed position; a spring tending to hold said circuit-closer out of contact; and a magnet in said local circuit adapted, when energized to release said catch from said circuit-closer and break the main circuit, substantially as described.

4. In a prepayment mechanism for electric meters, the combination with a rotatable spindle, and means for causing said spindle to rotate through the medium of an inserted coin; of a drum on said spindle; a flexible electric conductor secured to and wound upon said drum; a weight constituting a contact device in a local circuit suspended from said flexible conductor; a second contact device in said local circuit adapted to fall with the reduction of the volume of the electrolyte, and to make contact with said weight; an angular disk having a plurality of straight edges of equal length upon its periphery, rigidly mounted upon said spindle; a flat spring-arm bearing against the periphery of said disk, and adapted, when bearing against one of said straight edges, to retard the rotation of said spindle; a circuit-closer for the main circuit normally held out of contact; a disk rigidly mounted upon said spindle and provided with a plurality of equidistant peripheral lugs adapted to strike a projection on said circuit-closer and move the latter into contact during the partial rotation of said spindle; a spring-catch adapted to engage said circuit-closer when the latter has been moved to its closed position; and a magnet in said local circuit, adapted, when energized, to release said catch from said circuit-closer and break the main circuit, substantially as described.

5. In a prepayment electric meter, the combination with a vessel adapted to contain a liquid, and containing two electrodes having suitable electrical connections with the main circuit; a float mounted in said vessel and carrying a bent arm which extends outside said vessel and forms a contact device in a local circuit; of a suspended weight in said local circuit; coin-freed devices adapted upon the insertion of the proper coin, to lower said weight a predetermined distance and break said local circuit; a circuit-closer in the main circuit, adapted to be moved to the closed position by said coin-freed devices; a spring-actuated catch adapted to engage said circuit-closer in its closed position; a magnet in said local circuit adapted, upon becoming energized, to release said catch from said circuit-closer, and break the main circuit, substantially as described.

6. In a prepayment mechanism for electrical meters, the combination with a rotatable spindle, and means for checking the rotation of said spindle at equal intervals of a single rotation; of a contact device in a local circuit, adapted to be moved a predetermined distance out of contact, by each partial rotation of the spindle; a circuit-closer in the main circuit, adapted to be moved into contact by each partial rotation of said spindle; a device for automatically engaging said circuit-closer in its closed position; means acting upon said circuit-closer and tending to hold the latter out of contact; means operated by the local circuit when closed, to release said circuit-closer; a contact device in said local circuit adapted to be moved by the working of the meter, into contact with the first-named contact device in said local circuit; and means for imparting a partial rotation to said spindle through the medium of an inserted coin, substantially as described.

7. In a prepayment mechanism for electrical meters, the combination with a rotatable spindle, and means for checking the rotation of said spindle at equal intervals of a single rotation; of a contact device in a local circuit, adapted to be moved a predetermined distance out of contact, by each partial rotation of said spindle; a circuit-closer in the main circuit, adapted to be moved into contact by each partial rotation of said spindle; a device for automatically engaging said circuit-closer in its closed position; means acting upon said circuit-closer and tending to hold the latter out of contact; means operated by the local circuit when closed, to release said circuit-closer; a contact device in said local circuit adapted to be moved by the working of the meter, into contact with the first-named contact device in said local circuit; a disk on said spindle; a plurality of radial flanges, arranged in pairs equidistant from each other, upon one face of said disk, the flanges of each pair being arranged at such distance apart as to admit a coin of a predetermined size; a second disk mounted opposite the disk on said spindle, and having a single radial flange upon its inner face; a knob for turning the said second disk; and means for returning said disk to its initial position upon being released, substantially as described.

CHARLES ORME BASTIAN.

Witnesses:
FRANCIS W. FRIGOUT,
HERBERT D. JAMESON.